United States Patent Office 3,796,705
Patented Mar. 12, 1974

3,796,705
STILBENE DERIVATIVES
Adolf Emil Siegrist, Basel, Switzerland, assignor to
Ciba-Geigy AG, Basel, Switzerland
No Drawing. Filed Sept. 30, 1971, Ser. No. 185,395
Claims priority, application Switzerland, Oct. 1, 1970,
14,515/70
Int. Cl. C07d 55/04
U.S. Cl. 260—240 C
2 Claims

ABSTRACT OF THE DISCLOSURE

The invention concerns new fluorescent whitening agents corresponding to the formula

E—⟨ ⟩—CH=CH—⟨ ⟩—G wherein E denotes a benztriazol-2-yl or naphth-[1,2-d]-triazol-2-yl radical and G represents a radical of the formula

[structures]

wherein $R_1$ represents hydrogen, chlorine, alkyl or alkoxy with 1 to 4 carbon atoms, phenyl or phenylalkyl with 1 to 4 carbon atoms in the alkyl part, $R_2$ represents hydrogen or alkyl with 1 to 8 carbon atoms, $R_3$ and $R_3'$ are identical or different and denote hydrogen, alkyl with 2 to 4 carbon atoms or a methyl group in the m-position, chlorine or alkoxy with 1 to 2 carbon atoms, and $n$ represents the numbers 1, 2 or 3, as well as a process for their preparation by means of the anile-synthesis.

The invention relates to a new process for the manufacture of heterocyclic-substituted triazolyl derivatives of stilbene, new compounds from this class of stilbene derivatives and their use as optical brighteners.

The present process relates to the manufacture of stilbene derivatives of the formula (1a)    E—⟨ ⟩—CH=CH—⟨ ⟩—G' wherein E denotes a benztriazol-2-yl or naphth-[1,2-d]-triazol-2-yl radical and G' represents a radical of the formula

[structures]

wherein $R_1'$ denotes hydrogen, chlorine, alkyl or alkoxy with 1 to 4 carbon atoms, cyclohexyl, phenyl or phenylalkyl with 1 to 4 carbon atoms in the alkyl part, or phenoxy, $R_2$ represents hydrogen or alkyl with 1 to 8 carbon atoms, R and R' are identical or different and denote hydrogen, alkyl with 2 to 4 carbon atoms or a methyl group in the m-position, chlorine, phenyl or alkoxy with 1 or 2 carbon atoms and $n$ represents the numbers 1, 2 or 3, and of stilbene derivatives of the formula (1b)    E—⟨ ⟩—CH=CH—⟨ ⟩—G wherein E denotes a benztriazol-2-yl or naphth-[1,2-di]-triazol-2-yl radical and G represents a radical of the formula

[structures]

wherein $R_1$ represents hydrogen, chlorine, alkyl or alkoxy with 1 to 4 C atoms, phenyl for phenylalkyl with 1 to 4 C atoms in the alkyl part and $R_2$ represents hydrogen or alkyl with 1 to 8 C atoms, $R_3$ and $R_3'$ are identical or different and denote hydrogen, alkyl with 2 to 4 C atoms or a methyl group in the m-position, chlorine or alkoxy with 1 or 2 C atoms, and $n$ represents the numbers 1, 2 or 3.

The process according to the invention consists of reacting selected Schiff's bases, namely those of the formula (2)    E—⟨ ⟩—CH=N—⟨ ⟩—h
                                           k with a compound of the formula (3)    $CH_3$—⟨ ⟩—G' or $CH_3$—⟨ ⟩—G in the molar ratio of about 1:1, in the presence of dimethylformamide and of a potassium compound of the formula (4)    $KOC_{x-1}H_{2x-1}$ wherein the symbols E and G have the above-mentioned meaning, h and k are identical or different and represent hydrogen, chlorine or mtehoxy and x represents an integer from 1 to 6.

The present process is of preferred interest for the manufacture of compounds of the formula (5)    

wherein E denotes a benztriazol-2-yl or naphth-[1,2-d]-triazol-2-yl radical and $G_1$ represents a radical of the formula

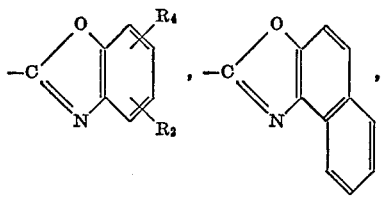

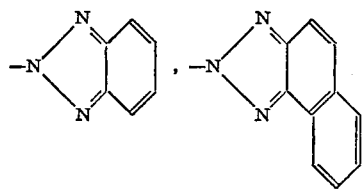

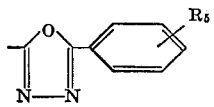

wherein $R_4$ represents hydrogen, chlorine, alkyl with 1 to 4 C atoms, methoxy, phenyl or phenylisopropyl, $R_2$ represents hydrogen or alkyl with 1 to 8 C atoms and $R_5$ represents hydrogen, alkyl with 2 to 4 C atoms, a methyl group in the m-position, chlorine or methoxy.

These compounds of the Formula 5 are manufactured by reacting a Schiff's base of the formula (2)    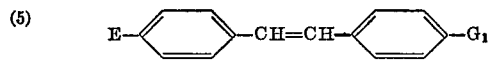

with a compound of the formula (6)    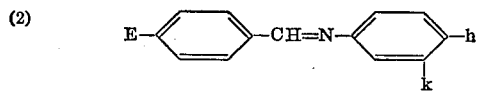

wherein E, $G_1$, h and k have the above-mentioned meaning.

The present process is also particularly suitable for the manufacture of the new stilbene derivatives of the formula (7)    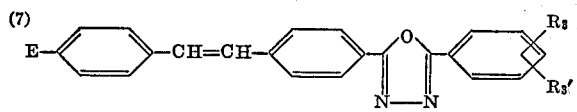

wherein E denotes a benztriazol-2-yl or naphth-[1,2-d]-triazol-2-yl radical and $R_3$ and $R_3'$ are identical or different and denote hydrogen, alkyl with 2 to 4 C atoms or a methyl group in the m-position, and also chlorine or alkoxy with 1 or 2 C atoms.

These compounds are obtained analogously to the procedure indicated above, by reacting a Schiff's base of the formula (2)    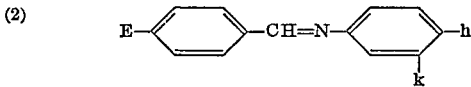

with a compound of the formula (8)    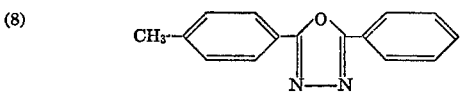

The process according to the invention is of particular interest for the manufacture of compounds of the formula (7a)

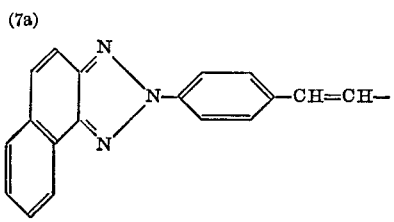

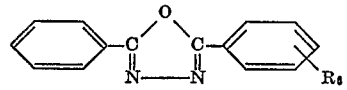

wherein $R_6$ represents hydrogen, alkyl with 2 to 4 carbon atoms or methyl in the m-position, chlorine, alkoxy with 1 to 2 carbon atoms or phenyl.

A general rule with regard to the above Formulae 1a, 1b, 5, 7 and 7a is that both with regard to preparation and with regard to applications those compounds are preferred in which, on the one hand, the symbol E denotes the naphthtriazolyl radical and, on the other hand, G, or G' or $G_1$ is either an optionally monosubstituted benzoxazolyl radical or an optionally monosubstituted 2-phenyl-oxdiazol-4-yl radical.

A general rule for the Schiff's bases to be used as the second reactant in the present manufacturing process is, in accordance with the basic reaction principle, that the Schiff's base must be free of reactive methyl groups or groups capable of salt formation. These Schiff's bases are the reaction products, which are in themselves known, of aromatic aldehydes of primary amines of which the amino group is bonded to a tertiary carbon atom. Though these primary amines can be of aliphatic, carbocyclic-aromatic or heterocyclic nature, for economic reasons hardly any other than aniline or its easily available derivatives deserve consideration. This is mainly due to the fact that the amine radical is split off during the reaction and is no longer present in the end product.

Accordingly, it is entirely possible for substituents to be present in the amine radical which do not interfere with the reaction or which, such as, for example, chlorine atoms, even accelerate the reaction.

The reactants carrying methyl groups (for example of the Formulae 3, 6, 8 and the like) are reacted with the Schiff's bases in the presence of dimethylformamide as the solvent.

Additionally, a strongly basic alkali compound is required for the reaction. By strongly basic alkali compounds there are to be understood, within the framework of the present invention, those compounds of the alkali metals (main Group I of the Periodic System of the Elements) including compounds of ammonium, which have a base strength of at least approximately that of lithium hydroxide. Accordingly, these may be compounds of lithium, sodium, potassium, rubidium, caesium or ammonium of the type of, for example, the alcoholates, hydroxides, amides, hydrides or sulphides, or strongly basic ion exchangers. For practical reasons (above all if mild reaction conditions, as regards the reaction temprepolymers), that is to say before or during the polymerization, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:

(a) Mixed with dyestuffs (shading) or pigments (colored or, in particular, for example, white pigments).

(b) Mixed with so-called "carriers," wetting agents, plasticizers, swelling agents, anti-oxidants, light protection agents and heat stabilizers.

(c) Mixed with crosslinking agents or finishes (for example starch or synthetic finishes), and in combination with the most diverse textile finishing processes, especially synthetic resin finishes (for example creaseproof finishes such as "wash-and-wear," "permanent-press" or "no-iron"), as well as flameproof finishes, soft handle finishes, anti-soiling finishes or antistatic finishes, or antimicrobial finishes.

(d) Incorporation of the optical brighteners into polymeric carriers (polymerization, polycondensation or polyaddtion products), in a dissolved or dispersed form, for use, for example, in coating compositions, impregnating compositions or binders (solutions, dispersions and emulsions) for textiles, fleeces, paper and leather.

(e) As additives to so-called "master batches."

(f) As additives to the most diverse industrial products in order to render these more marketable (for example improving the appearance of pigments).

(g) In combination with other optically brightening substances.

(h) In spinning bath preparations, that is to say as additives to spinning baths such as are used for improving the slip for the further processing of synthetic fibres, or from a special bath before the stretching of the fibre.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example polyester fibres, with the brighteners according to the invention, is to impregnate these fibres with the aqueous dispersions (or, where appropriate, solutions) of the brighteners at temperatures below 75° C., for example at room temperature, and to subject them to a dry heat treatment at temperatures above 100° C., it being generally advisable additionally to dry the fibre material beforehand at a moderately elevated temperature, for example at not less than 60° C. and up to about 130° C. The heat treatment in the dry state is then advantageously carried out at temperatures between 120 and 225° C., for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and at times up to about 2 percent by weight can also be employed. For most practical purposes, amounts between 0.0005 and 0.5 percent by weight are of preferred interest.

In the examples, the parts, unless otherwise stated, are always parts by weight and the percentages are always percentages by weight. Unless otherwise stated, melting points and boiling points are uncorrected.

EXAMPLE 1

4.79 g. of the Schiff's base of the formula (9)
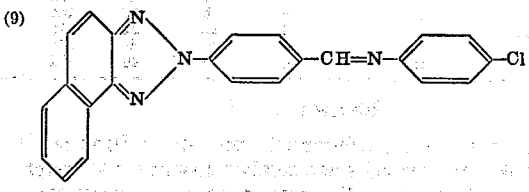

(melting point: 223 to 224° C.), 2.62 g. of 4-(benzoxazol-2-yl)-toluene of the formula

(10)
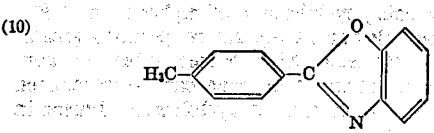

and 6.25 g. of potassium hydroxide powder containing about 10% of water are stirred in 100 ml. of dimethylformamide, whilst excluding air. The temperature is brought to 40° C. over the course of 30 minutes, in the course of which a dark violet coloration appears. The reaction mixture is stirred for a further 90 minutes at 40 to 45° C., 200 ml. of methanol are thereafter added and the mixture is cooled to 0° C. The product which has precipitated is filtered off, washed with 200 ml. of methanol and dried. 3.8 g., corresponding to 65.5% of theory, of 4-(naphth-[1,2 - d]-triazol-2-yl)-4'-(benzoxazol-2-yl)-stilbene of the formula

(11)
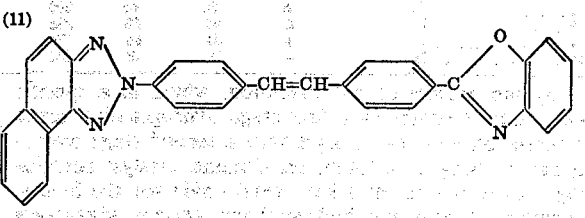

are obtained in the form of a greenish-tinged yellow powder melting at 303 to 304° C. On recrystallizing twice from o-dichlorobenzene (fuller's earth), 3.0 g. (51.7% of theory) of greenish-tinged yellow, very fine felted small needles of melting point 306 to 307° C. are obtained.

Analysis.—Calculated for $C_{31}H_{20}N_4O$ (464.50) (percent): C, 80.15; H, 4.34; N, 12.06. Found (percent): C, 80.05; H, 4.39; N, 12.06.

The 4 - (naphth - [1,2 - d] - triazol - 2 - yl) - 4'-(benzoxazol-2-yl)-stilbene derivatives of the formula

(12)
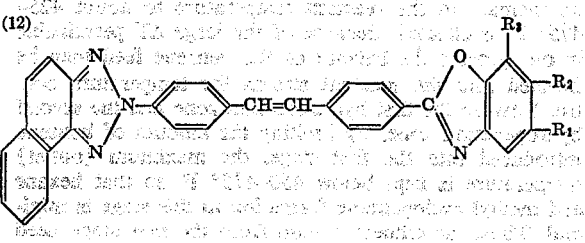

perature, appear indicated) potassium compounds of the composition (4) 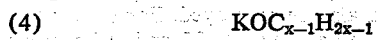$KOC_{x-1}H_{2x-1}$ are normally used, wherein $x$ represents an integer from 1 to 6, such as, for example, potassium hydroxide or potassium tertiary-butylate. In the case of alkali-alcoholates and alkali amides (and hydrides) the reaction must be carried out in a practically anhydrous medium, whilst in the case of alkali hydroxides water contents of up to 25% (for example the presence of water of crystallization) are permitted. In the case of potassium hydroxide, a water content of up to about 15% has proved suitable. As examples of other usable alkali compounds there may be mentioned sodium methylate, sodium hydroxide, sodium amide, lithium amide, lithium hydroxide, rubidium hydroxide, caesium hydroxide and the like. Of course it is also possible to work with mixtures of such bases.

Appropriately, the reactants containing methyl groups are reacted with the Schiff's bases in the stoichiometric ratio of 1:1, so that no significant excess of either component is present. Advantageously, at least the equivalent amount of the alkali compound is used, that is to say at least 2 mols of a compound with, for example, a KO group, per one mol of Schiff's base. When using potassium hydroxide, a 4-fold to 8-fold amount is preferably used.

The reaction according to the invention can generally be carried out at temperatures in the range of between about 10 and 150° C. If alcoholates are used as the potassium compound in the reaction, the reaction frequently already succeeds at room temperature, in which case no external supply of heat is necessary. When using potassium hydroxide it is in most cases necessary to carry out the process at a higher temperature. For example, the reaction mixture is slowly warmed to 30 to 100° C. and is then kept at this temperature for some time, for exarmple ½ to 2 hours. The final substances can be worked up from the reaction mixture in accordance with known methods.

The new compounds defined above show a more or less pronounced fluorescence in the dissolved or finely divided state. They can be used the optical brightening of the most diverse synthetic or semi-synthetic materials, or substances which contain such organic materials.

The following groups of organic materials, where optical brightening thereof is relevant, may be mentioned, as examples of the above, without the survey given below being intended to express any restriction thereto.

(I) Synthetic organic high molecular materials:

(a) Polymerization products based on organic compounds containing at least one polymerizable carbon-carbon double bond, that is to say their homopolymers or copolymers as well as their after-treatment products such as, for example, cross-linking, grafting or degradation products, polymer blends or products obtained by modification of reactive groups, for example polymers based on $\alpha,\beta$-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as, for example, ethylene, propylene, styrenes or dienes and also so-called ABS polymers), and polymers based on vinyl and vinylidene compounds (such as, for example, vinyl chloride, vinyl alcohol or vinylidene chloride), (b) Polymerization products such as are, for exmple, obtainable by ring opening, for example, polyamides of the polycaprolactam type, and also polymers which are obtainable both via polyaddition and via polycondensation, such as polyethers or polyacetals, (c) Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyesters) or unsaturated (for example maleic acid dialcohol polycondensates as well as their crosslinking products with copolymerizable vinyl monomers), unbranched or branched (also based on higher-functional alcohols, such as, for example, alkyd resins) polyesters, polyamides (for example hexamethylenediamine adipate), maleate resins, melamine resins, their precondensates and analogues, polycarbonates and silicones, (d) Polyaddition products such as polyurethanes (crosslinked and non-crosslinked) and expoxide resins.

(II) Semi-synthetic organic materials, for example, cellulose esters of varying degrees of esterification (so-called 2½-acetate or triacetate) or cellulose ethers, regenerated cellulose (viscose or cuprammonium cellulose) or their after-treatment products, and casein plastics.

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection mouldings, various machined articles, chips, granules or foams, and also predominantly two-dimensional bodies such as films, foils, lacquers, coatings, impregnations and laminations, or predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flocked structures or woven textiles fabrics, textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form or hanks, woven fabrics, knitted fabrics, fleeces, flocked substrates or laminates, are to be optically brightened according to the invention, this is advantageously effected in an aqueous medium, wherein the compounds in question are present in a finely divided form, (suspensions, so-called micro-dispersions or possibly solutions). If desired, dispersing agents, stabilizers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20 to 140° C., for example at the boiling point of the bath or near it (about 90° C.). Solutions or emulsions in organic solvents can also be used for the finishing, according to the invention, of textile substrates, as is practised in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, sheets (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or listed in the table which follows can be manufactured in a similar manner:

| Number | R₁ | R₂ | R₃ | Melting point, °C |
|---|---|---|---|---|
| 13 | —CH₃ | H | H | 278–279 |
| 14 | H | —CH₃ | H | 271–272 |
| 15 | —CH₃ | —CH₃ | H | 299–300 |
| 16 | —CH₃ | H | —CH₃ | 260–261 |
| 17 | —CH₂—CH₃ | H | H | 237–238 |
| 18 | —CH₂—CH₂—CH₃ | H | H | 271–272 |
| 19 | —CH(CH₃)₂ | H | H | 265–266 |
| 20 | —C(CH₃)₃ | H | H | 288–289 |
| 21 | Same as above | H | —CH₃ | 245–246 |
| 22 | —CH₃ | H | —C(CH₃)₃ | 282–283 |
| 23 | —C(CH₃)₂—CH₂—C(CH₃)₃ | H | H | 273–274 |
| 24 | —CH₂—C₆H₅ | H | H | 280–281 |
| 25 | —C(CH₃)₂—C₆H₅ | H | H | 236–237 |
| 26 | —CH(CH₂CH₂)₂ (cyclopentyl) | H | H | 291–292 |
| 27 | Cl | H | H | 298–299 |
| 28 | Cl | H | —CH₃ | 265–266 |
| 29 | —OCH₃ | H | H | 256–257 |
| 30 | H | —O—C₆H₅ | H | 259–260 |
| 31 | —C₆H₅ | H | H | 278–279 |
| 32 | H | —C₆H₅ | H | 286–287 |

The 4-(naphth-[1,2-d]-triazol-2-yl)-benzaldehyde of the formula

(33) 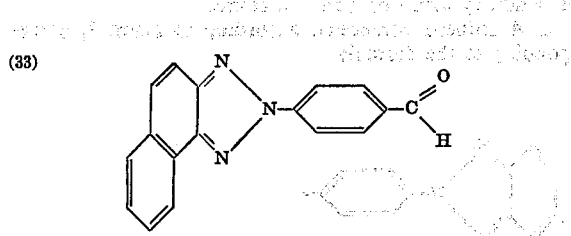

(melting point: 202 to 203° C.), used for the preparation of the Schiff's base of the Formula 9, can be obtained by reaction of 4-(naphth-[1,2-d]-triazol-2-yl)-toluene with N-bromo-succinimide and subsequent Sommelet reaction.

EXAMPLE 2

4.79 g. of the Schiff's base of the formula (9) 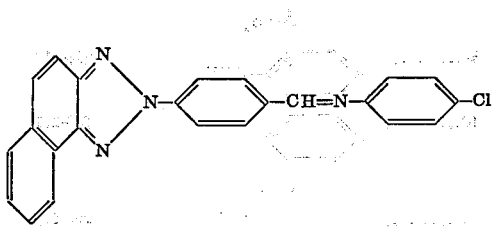

2.96 g. of 2-phenyl-5-(p-tolyl)-1,3,4-oxadiazole of the formula

(34) 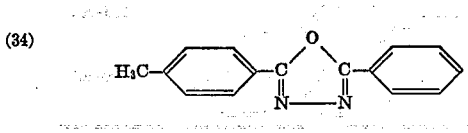

and 6.25 g. of potassium hydroxide powder containing about 10% of water are stirred in 150 ml. of dimethylformamide, whilst excluding air. The temperature is brought to 40° C. over the course of 30 minutes, in the course of which a violet coloration appears. The reaction mixture is stirred for a further 60 minutes at 40 to 45° C., 300 ml. of methanol are thereafter added and the whole is cooled to 0° C. The product which precipitates is filtered off, washed with 500 ml. of methanol and dried. 4.2 g., corresponding to 68.8% of theory, of 4-(naphth-[1,2-d]-triazol-2-yl)-4'-(5 - phenyl-1,3,4-oxadiazol-2-yl)-stilbene of the formula (35)

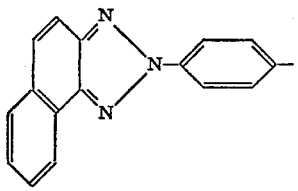

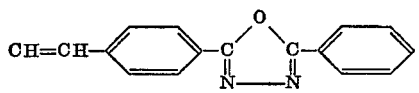

are obtained in the form of a greenish-tinged yellow powder which melts at 254 to 256° C. On recrystallizing twice from o-dichlorobenzene (fuller's earth) and thereafter from xylene, 3.1 g. (50.5% of theory) of greenish-tinged yellow, very fine crystals of melting point 262 to 263° C. are obtained.

Analysis.—Calculated for $C_{32}H_{21}N_2O$ (491.55) (percent): C, 78.19; H, 4.31; N, 14.25. Found (percent): C, 78.36; H, 4.35; N, 14.01.

The 4-(naphth-[1,2-d]-triazol - 2 - yl) - 4' - (5-phenyl-1,3,4-oxadiazol-2-yl)-stilbene derivatives of the formula (36)

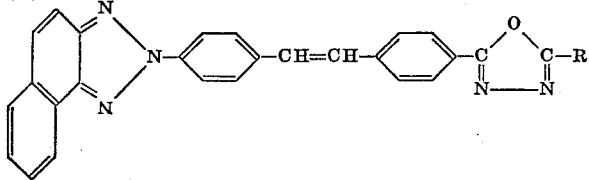

listed in the table which follows can be prepared in a similar manner:

| Number | R | Melting point, ° C. |
|---|---|---|
| 37 | ⌬—OCH₃ | 211–212 |
| 38 | ⌬—OCH₃ | 233–234 |
| 39 | ⌬—OCH₃ | 236–237 |
| 40 | ⌬—CH₃ | 260–261 |
| 41 | ⌬—C(CH₃)₃ | 269–270 |
| 42 | ⌬—Cl | 293–294 |
| 43 | ⌬—⌬ | 300–301 |

EXAMPLE 3

100 parts of polyester granules of terephthalic acid ethylene glycol polyester are intimately mixed with 0.05 part of one of the compounds of the Formulae 35 or 37 to 43 and fused at 285° C. whilst stirring. After spinning the spinning composition through customary spinnerets, strongly brightened polyester fibres are obtained.

The above-mentioned compounds can also be added to the starting substances before or during the polycondensation to give the polyester.

EXAMPLE 4

A polyester fabric (for example "Dacron") is padded at room temperature (about 20° C.) with an aqueous dispersion which per litre contains 2 g. of the compound of the Formula 37 and 1 g. of an addition product of about 8 mols of ethylene oxide to 1 mol of p-tert.octylphenol, and is dried at about 100° C. The dried material is subsequently subjected to a heat treatment at 170 to 220° C., lasting from 2 minutes to a few seconds depending on the temperature. The material treated in this way has a substantially whiter appearance than the untreated material.

EXAMPLE 5

10,000 g. of a polyamide manufactured from hexamethylenediamine adipate in a known manner, in the form of chips, are mixed with 30 g. of titanium dioxide (rutile modification) and 5 g. of one of the compounds of the Formulae 35 or 37 to 43 in a tumbler vessel for 12 hours. The chips thus treated are fused in a kettle heated to 300 to 310° C. by means of oil or diphenyl vapor, after having displaced the atmospheric oxygen by steam, and are stirred for half an hour. The melt is thereafter extruded through a spinneret under a nitrogen pressure of 5 atmospheres gauge and the filament which has been spun in this way and cooled is found up on a spinning bobbin. The resulting filaments show an excellent brightening effect of good fastness to washing and to light.

If, instead of a polyamide manufactured from hexamethylenediamine adipate, a polyamide manufactured from ε-caprolactam is employed, similarly good results are obtained.

What is claimed is:

1. A stilbene compound of the formula

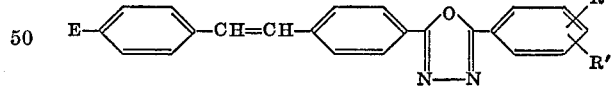

wherein E denotes a benztriazol-2-yl or naphth-[1,2-d]-triazol-2-yl radical and R and R' are identical or different and denote hydrogen, alkyl with 2 to 4 carbon atoms or a methyl group in the m-position, and also chlorine, phenyl or alkoxy with 1 or 2 carbon atoms.

2. A stilbene compound according to claim 1, corresponding to the formula

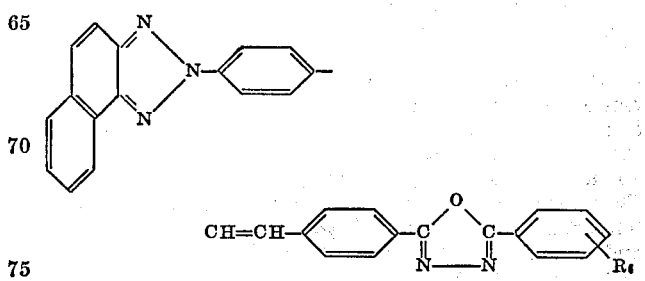

wherein $R_6$ represents hydrogen, alkyl with 2 to 4 carbon atoms or methyl in the m-position, chlorine, alkoxy with 1 to 2 carbon atoms or phenyl.

References Cited

UNITED STATES PATENTS 3,351,591  11/1967  Siegrist et al. ---- 260—240 CA

FOREIGN PATENTS 11,243  5/1968  Japan ---------- 260—240 CA

OTHER REFERENCES

Chemical Abstracts, vol. 68, abstract No. 21961 (pp. 2119–2120) (1968) (abstract of Netherlands appl. 6615211).

JOHN D. RANDOLPH, Primary Examiner

U.S. Cl. X.R.

8—115.5, 115.6, 116.2; 117—33.5 R, 33.5 T, 136, 138.5, 139.4, 139.5 R; 162—162; 252—301.2 W; 260—2 EP, 2 S, 37 P, 39 P, 40 P, 41 C, 75 N, 77.5 D, 78 R, 88.7 G, 89.5 A, 93.7, 94.9 GD, 240 CA, 240 G, 240.9